United States Patent [19]

Hultgren

[11] 4,335,989
[45] Jun. 22, 1982

[54] MINIATURE SLIDE STORAGE TRAY AND METHOD OF USING SAME

[76] Inventor: Claes L. Hultgren, 334 Harris Ave., Clarendon Hills, Ill. 60514

[21] Appl. No.: 207,607

[22] Filed: Nov. 17, 1980

Related U.S. Application Data

[62] Division of Ser. No. 931,606, Aug. 7, 1978, Pat. No. 4,253,789.

[51] Int. Cl.$^3$ .............................................. G03B 23/06
[52] U.S. Cl. .................... 414/405; 414/786; 206/216; 206/456; 312/11; 353/117
[58] Field of Search ...................... 414/404, 405, 786; 206/216, 316, 449, 454–456, 555, 556; 312/10, 11, 97.1, 283; 220/23.86; 53/392; 353/116, 117; 271/64, 173

[56] References Cited

U.S. PATENT DOCUMENTS

| | | | |
|---|---|---|---|
| 3,584,946 | 6/1971 | Rube | 353/117 |
| 3,692,376 | 9/1972 | McKinsey | 312/11 |
| 3,765,738 | 10/1973 | Cobb | 312/11 |
| 3,843,246 | 10/1974 | Johannsen | 206/456 X |
| 3,873,195 | 3/1975 | Otto | 353/117 |
| 3,926,313 | 12/1975 | Winkler | 206/456 X |
| 3,977,519 | 8/1976 | Hultgren | 206/456 X |
| 4,050,751 | 9/1977 | Stange | 271/64 X |

FOREIGN PATENT DOCUMENTS 2304013 8/1974 Fed. Rep. of Germany ...... 353/117
2320029 11/1974 Fed. Rep. of Germany ...... 353/117

*Primary Examiner*—Trygve M. Blix
*Assistant Examiner*—Terrance L. Siemens
*Attorney, Agent, or Firm*—Merriam, Marshall & Bicknell

[57] ABSTRACT

A miniature slide storage tray having a plurality of annularly arranged, radially extending compartments for receiving and storing a plurality of slides in a compactly arranged manner so that the storage tray and slides require a minimum of storage space. An annular slide transfer tray having a plurality of radially extending compartments corresponding to the compartments in the storage tray is temporarily engageable with the storage tray and the mated storage and transfer trays are temporarily engageable with an associated, annular, slide projection tray. Alignment and indexing structure maintains alignment between the respective compartments in the storage, transfer and projection trays when these parts are in mated relationship. Transfer of slides between the compartments in the storage and transfer trays is effected by radially shifting the slides between these compartments and transfer of slides between the compartments of the transfer and projection trays is effected by gravity by inverting the mated trays. A novel method is employed to transfer slides from the compartments of the slide storage tray into the compartments of the slide transfer tray and then into the compartments of the associated slide projection tray, and vice versa.

19 Claims, 9 Drawing Figures

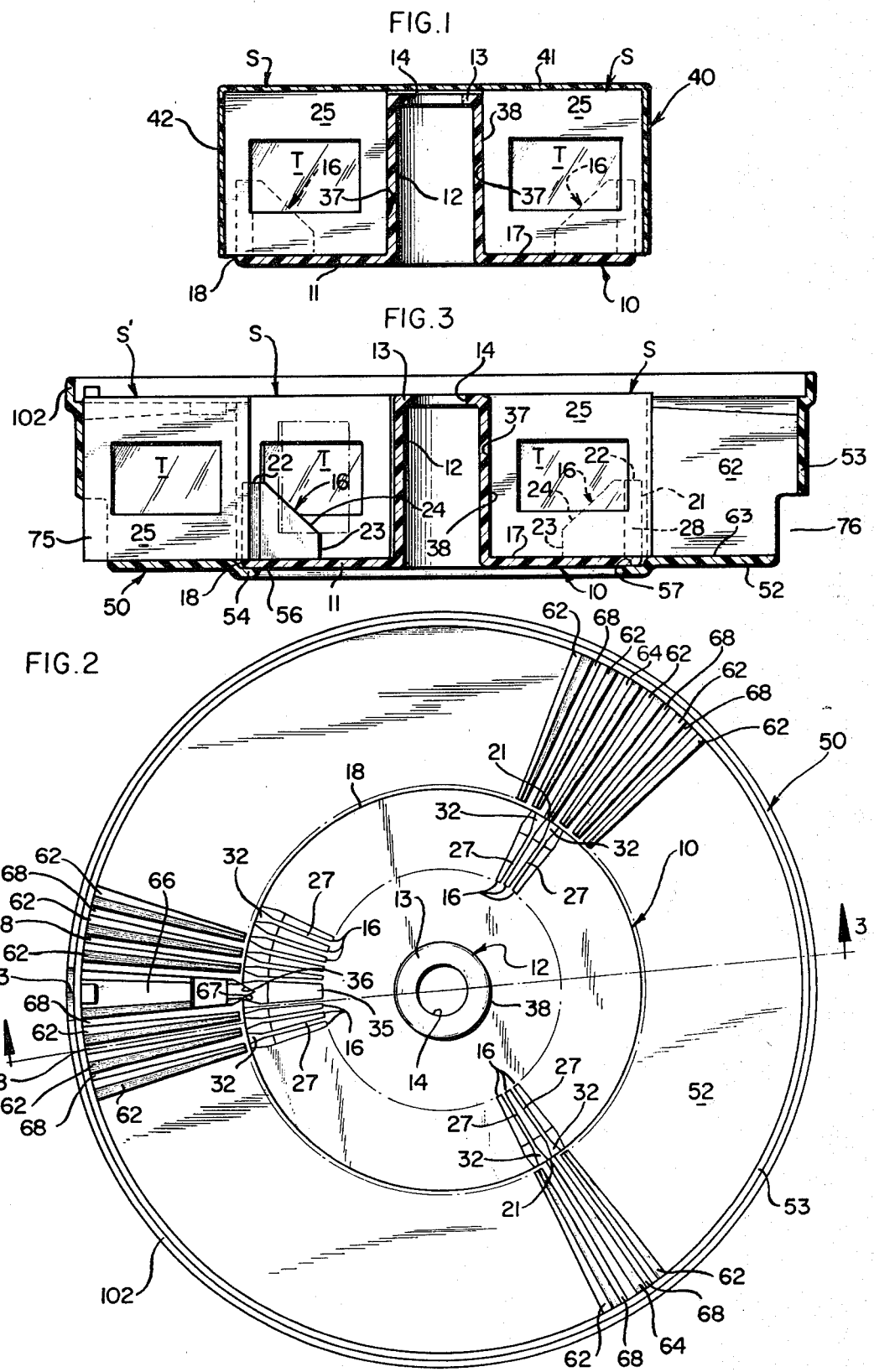

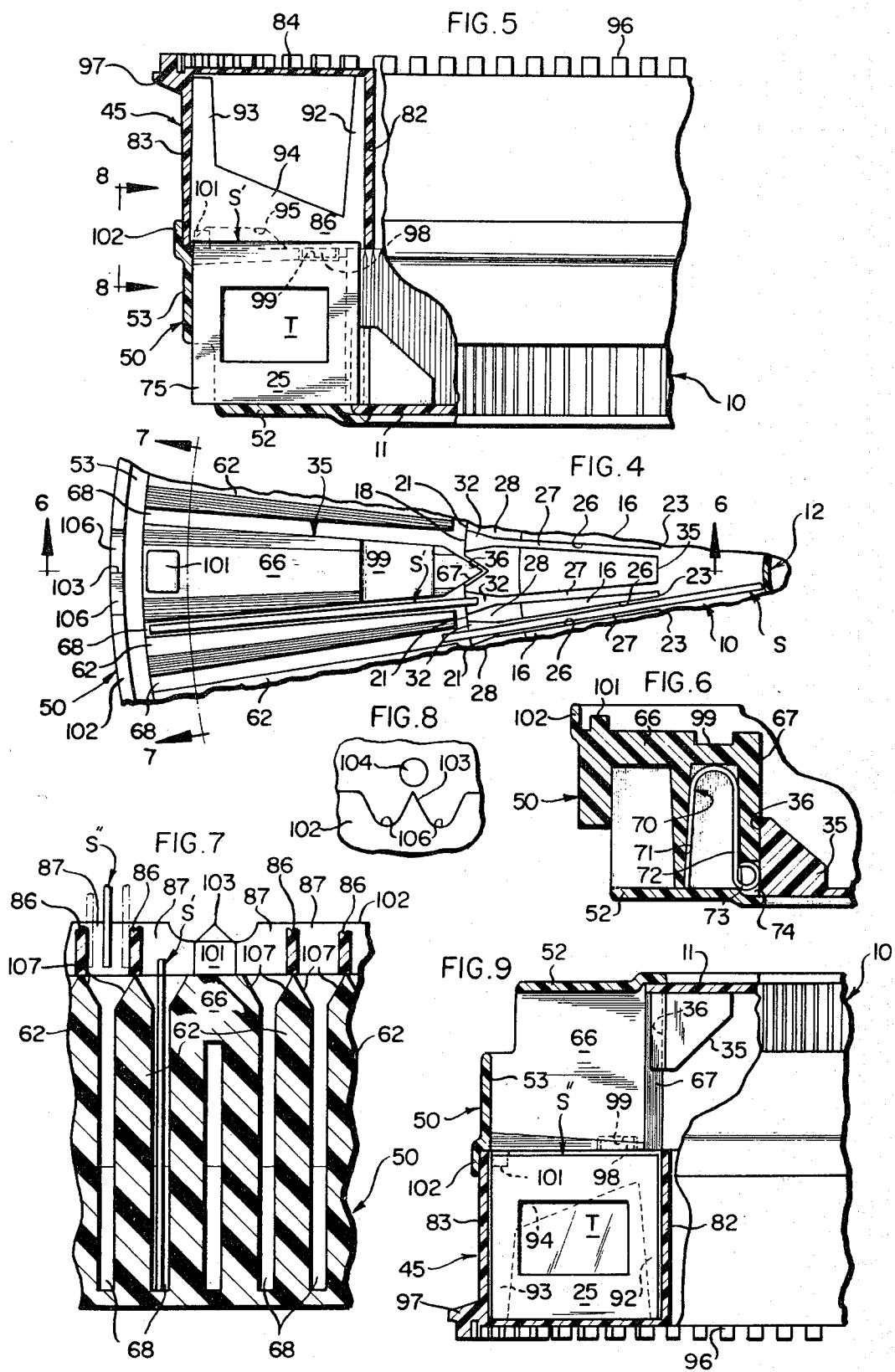

MINIATURE SLIDE STORAGE TRAY AND METHOD OF USING SAME

This is a division, of application Ser. No. 931,606, filed Aug. 7, 1978, now U.S. Pat. No. 4,253,789.

This invention relates generally to photographic slide storage systems and more particularly to a miniature slide storage tray and method of using the same.

Many of the slide projectors presently available and heretofore developed utilize special magazines or projection trays having compartments therein for receiving a plurality of slides so that the latter may be projected in a desired sequence. Such magazines or projection trays also serve as storage containers for the slides. Since the slide magazines or projection trays for a particular projector are usually not interchangeable with those for different projectors and since it is more convenient to leave the slides in the magazine or projection tray rather than to load and unload the tray from a bulk storage container, or from individual boxes thereof, a user can accumulate a substantial number of projection trays in a very short period of time. Storage of such magazines and projection trays may become a problem since many of these are relatively large and hence take up a considerable amount of space.

In addition to the disadvantage of requiring a large amount of storage space, many of the slide projection trays presently in use are relatively expensive and hence increase a user's operating costs.

Accordingly, it is a general object of the present invention to provide a novel and improved slide storage tray which is free of the aforementioned disadvantages and objections.

Another object is to provide a novel slide storage tray which is particularly adapted for use with an annular slide projection tray having a plurality of radially extending compartments therein for receiving and supporting a plurality of slides in segregated relation in the compartments.

A more particular object is to provide a novel apparatus for storing a plurality of slides in a compact manner when not in use so that a user need only purchase miniaturized, inexpensive slide storage trays, a single slide transfer tray and a single slide projection tray.

Another object is to provide a novel method of transferring slides, arranged in a predetermined sequence, from compartments in a miniature slide storage tray into corresponding compartments in a slide transfer tray and thence into corresponding compartments in an associated slide projection tray.

A further object is to provide a novel method of transferring slides from the compartments in an annular slide projection tray into corresponding compartments in an intermediate slide transfer tray and then into corresponding compartments in a miniature slide storage tray so that the slides can be stored in a compact manner and require relatively little storage space when not in use.

These and other objects of the invention will become apparent from the following detailed description and accompanying sheets of drawings in which:

FIG. 1 is a vertical sectional view through a slide storage tray embodying the features of the present invention;

FIG. 2 is a top plan view, with portions of the structure thereof omitted for simplicity of illustration, of the slide storage tray illustrated in FIG. 1 as the latter would appear when operatively engaged with a slide transfer tray embodying the features of the present invention;

FIG. 3 is a transverse sectional view taken substantially along the line 3—3 of FIG. 2;

FIG. 4 is an enlarged, fragmentary top plan view of a portion of the mated slide storage and transfer trays illustrated in FIG. 2 and showing additional details of the structure for maintaining the trays in radially aligned and indexed relation;

FIG. 5 is a fragmentary vertical sectional view of a portion of the assembly illustrated in FIG. 2 as the latter would appear when engaged with an associated slide projection tray and prior to transfer of slides into the compartments of the projection tray;

FIG. 6 is a reduced, fragmentary sectional view, taken along the line 6—6 of FIG. 4, and showing additional structural details of the assembly;

FIG. 7 is an enlarged, sectional view taken substantially along the line 7—7 of FIG. 4 and with portions of the ribs of an associated slide projection tray added;

FIG. 8 is a fragmentary side elevational view, taken substantially along the line 8—8 of FIG. 5; and FIG. 9 is a fragmentary vertical sectional view, similar to FIG. 5, and showing the manner in which slides in the compartments of the slide transfer tray are transferred into the compartments of the associated slide projection tray when the mated storage, transfer and projection trays are inverted.

Briefly described, the present invention contemplates a novel miniaturized slide storage tray for receiving and storing a plurality of slides in a compact, prearranged manner so as to minimize the space required for storage of the slides when the latter are not in use. The storage tray includes a plate-like base having a plurality of radially extending ribs thereon defining a plurality of compartments for receiving and retaining the slides in segregated, circumferentially spaced relation. A centrally disposed abutment extends upwardly from the base of the tray and acts as a stop for limiting radially inward movement of and locating the slides in their compartments.

Transfer of slides from the compartments of the storage tray into compartments in an associated, annular slide projection tray is achieved by transferring slides into corresponding compartments in an intermediate slide transfer tray, engageable with the storage and projection trays.

Alignment and indexing means carried by the slide transfer and storage trays maintains the trays in concentric alignment when the trays are in engaged, operative relation and also assures radial alignment between the the respective compartments of the trays. The alignment and indexing means also assures axial alignment between the compartments in the transfer tray and the compartments in an associated slide projection tray prior to inversion of the mated storage, transfer and projection trays to effect transfer of slides from the compartments in the transfer tray into the compartments of the projection tray. A cover may be employed to retain the slides in their compartments in the storage tray and also to prevent dust particles from accumulating on the transparency portions of the slides.

The present invention also contemplates a novel method for transferring slides from compartments in a miniaturized slide storage tray into compartments in an associated slide projection tray for projection in a slide projector. Such method includes the steps of engaging a slide transfer tray with the slide storage tray so that the respective compartments in the storage and transfer trays are radially aligned, transferring the slides from the compartments of the storage tray into the compartments of the transfer tray, inverting the associated slide projection tray, engaging the projection tray with the transfer tray so that the compartments in the projection and transfer trays are axially aligned, and inverting the engaged storage, transfer and projection trays to effect transfer of the slides substantially simultaneously from the transfer tray to the projection tray.

The present invention also contemplates the method of transferring slides from the compartments of an annular projection tray into the compartments of a substantially smaller and less expensive slide storage tray so as to substantially reduce the space required to store the slides. Such method includes the steps of engaging an annular transfer tray with the storage tray so that the compartments in the storage and transfer trays are in radial alignment, inverting the mated storage and transfer trays, engaging the inverted trays with the projection tray while maintaining axial alignment between the compartments in the projection and transfer trays, inverting the mated projection, transfer and storage trays to effect transfer of slides from the projection tray into the transfer tray, disengaging the projection tray from the transfer and storage trays, effecting movement of the slides in the compartments of the transfer tray into the compartments of the storage tray, and disengaging the transfer tray from the storage tray.

In my prior U.S. Pat. No. 3,977,519, a slide storage tray is disclosed and claimed for storing a plurality of slides in a prearranged sequence and for simply and rapidly transferring slides from compartments in the storage tray into corresponding compartments in an associated, annular slide projection tray. The storage tray, which is also annular in form and of substantially the same size as the projection tray, is temporarily mated with the projection tray and then both trays are inverted while mated to effect the transfer. After projection, the storage tray is again mated with the projection tray and the mated trays are inverted to transfer the slides from the compartments of the projection tray into the compartments of the storage tray. Since the storage tray does not require the same structure and close tolerances as the associated slide projection tray, it is substantially less expensive to manufacture and purchase than the projection tray. Consequently, substantial savings may be realized because of the fact that only inexpensive slide storage trays need be purchased instead of the more costly slide projection trays.

The slide storage tray disclosed herein is an improvement over the slide storage tray illustrated and described in my aforementioned U.S. patent in that my improved tray is substantially smaller than my earlier developed storage tray. Consequently, my improved tray, when fully loaded with slides, can be stored in a substantially smaller storage area than my previously patented tray. In addition, the cost of manufacturing my improved storage tray is also correspondingly less than that of my earlier tray.

Referring now to FIGS. 1 and 2, a slide storage tray embodying the features of the present invention is indicated generally at 10. The storage tray 10 preferably comprises a circular plate-like base 11 having a cylindrical abutment or post 12 extending upwardly from the center of the base 11. The post 12 is preferably hollow and has an axial height somewhat less than that of the vertical height or width of a conventional slide, which is approximately 2 inches (5 cm.). The upper end wall, indicated at 13, of the post 12 is provided with an opening 14 to facilitate handling of the tray 10 by inserting the end of a finger into the opening 14.

In order to define a plurality of compartments on the storage tray 10 for maintaining a plurality of slides in segregated, circumferentially spaced relation, partition means in the form of a plurality of upstanding ribs 16 are provided on the upper surface, indicated at 17, of the base 11. In the present instance, eighty of the ribs 16 are provided, each of which extends radially inwardly from the outer periphery, indicated at 18 of the base 11, and has a radial length of approximately 1 inch (2.54 cm.). The height of each rib 16 at the outer periphery 18 of the base 11 is about 0.9 inches (2.285 cm.). The upper edge, indicated at 22, of each rib 16 extends horizontally inwardly from the peripheral edge 18 for a distance of about 0.3 inches (0.762 cm.), the inner end of the upper edge 22 being joined with the radially inner vertical edge, indicated at 23, by a diagonally downwardly extending edge 24. The length of the inner vertical edge 23 of each rib is about 0.3 inches (0.762 cm.). The diagonally extending edge 24 of each rib 16 eliminates any sharp corner which could possibly contact the central transparency portion, indicated at T in FIG. 1, of a slide, such as the slides S shown in FIGS. 1 and 3, when the latter are shifted relative to the ribs. The transparency portion T of each slide S, in the present instance, is supported by a cardboard mount 25.

Referring now to FIG. 4 in conjunction with FIGS. 1 and 2, it will be seen that the side face, indicated at 26, of each rib 16 is parallel to the side face 26 of an adjacent rib so as to define spaces or gaps, indicated at 27, therebetween comprising open-ended compartments for slidably receiving and supporting slides. Since the width of the cardboard mounting 25 of each slide S is about 0.044 inches (0.112 cm.), the width of each space 27 is preferably about 0.06 inches (0.152 cm.) in order to provide sufficient clearance and free movement of the slides in the compartments. It will be understood that the width of the spaces 27 could be varied to accommodate slides having mountings of different thickness than the cardboard mounting 25.

The radially outer end portions, indicated at 28, of each rib 16 tapers radially inwardly toward the outer edge 21 thereof so as to define a flared opening or entrance 32 at the radially outer end of each space 27. The purpose and function of the flared entrances 32 will be described more fully hereinafter.

The storage tray 10 also includes a rib or partition 35 which is wider than the other ribs 16 and which, together with the ribs 16, defines eighty spaces or compartments 27 in the tray 10. The rib 35 is provided with a recess in the form of a vertically extending, V-shaped groove 36 (FIGS. 2 and 4) in the radially outer end thereof. The groove 36 comprises part of interfitting means and the latter comprises part of aligning and indexing means to be hereinafter described in greater detail.

With the foregoing construction, it will now be apparent that when eighty slides are positioned in the spaces or compartments 27 of the storage tray 10 with the radially inner vertical edges, indicated at 37 in FIG. 1, of each slide engaging the outer surface, indicated at 38, of the post 12, the slides will be arranged in a very compact manner and only require a storage area of about 27.56 square inches (177.8 cm.$^2$). By comparison, the cross sectional area of the projection tray for Carousel slide projector is approximately 95.06 square inches (613 cm.²).

In this regard, since the maximum number of slides that can be mounted in the storage tray 10 is eighty, the outside diameter of the post 12 may approximately be determined by summing the thicknesses of the total number of slides that can be accommodated by the tray 10 and dividing this figure by the constant $\pi$. Since the thickness of the edges of slides using cardboard mounts tends to increase as a result of repeated movement into and out of an associated slide projector, I prefer to construct the post 12 with an outside diameter of about 1.25 inches (3.175 cm.).

A dust cover 40 having a circular, plate-like top 41 and a cylindrical side wall 42 may be provided to prevent dust and lint from being deposited on slides carried by the tray 10 and to retain the slides in nested relation, as shown in FIG. 1.

Assuming that a user desires to transfer the slides in the storage tray 10 to a slide projection tray, such as the tray 45 illustrated in FIG. 5, the slides S must first be transferred into compartments in an intermediate slide transfer tray 50 illustrated in FIGS. 2-5, inclusive. The transfer tray 50 preferably comprises an annular, plate-like base 52 and a peripheral side wall 53. A portion, indicated at 54, of the base 52 adjacent to the margin, indicated at 56, of an enlarged opening in the transfer tray base 52 is offset to provide a shoulder or ledge 57 for supporting the base 11 of the storage tray 10 in substantially coplanar relation with the base 52 of the transfer tray 50.

The transfer tray 50 also includes partition means in the form of a plurality of upstanding ribs 62 on the upper surface, indicated at 63, of the base 52, which extend radially inwardly from the peripheral wall 53 and terminate short of the offset portion 54, as illustrated in FIG. 3. At least one, and preferably two, circumferentially spaced ribs (FIG. 2) extend radially inwardly beyond the other ribs 62 so as to engage the radially outer edges 21 of the ribs 16 of the storage tray 10 when the latter is engaged with the transfer tray 50. The ribs 64 comprise another part of the aforementioned aligning and indexing means and serve to center the base 11 of the storage tray 10 in the annular base 52 of the transfer tray 50, as shown in FIGS. 2 and 3.

The transfer tray 50 includes a somewhat wider and longer "O" rib or partition 66, the radially inner edge of which, indicated at 67, is V-shaped in cross section and adapted to extend into the groove 36 in the rib 35 of the stoage tray 10. The edge 67 of the transfer tray rib 66 thus coacts with the ribs 64 to center the storage tray 10 in the transfer tray 50 and thus comprises another part of the above-mentioned aligning means. The V-shaped edge 67 and V-shaped groove 36 in the rib 35 of the storage tray 10 also comprise interfitting means for indexing the compartments 27 in the storage tray with respective compartments defined by the spaces, indicated at 68, between the ribs 62 of the transfer tray 50.

The transfer tray 50 also includes releasable retaining means for releasably retaining the trays 10 and 50 in engaged, nested relation, as shown in FIGS. 3 and 5, prior to and after transfer of slides from the compartments 27 of the storage tray 10 into the compartments 68 of the transfer tray 50, and vice versa. Such releasable retaining means, in the present instance, comprises an inverted, U-shaped spring 70 (FIG. 6) which is mounted in a cavity 71 in the "O" rib 66 of the transfer tray 50. One leg 72 of the spring 70 is provided with a loop 73 which partially extends through an opening 74 in the lower end of the V-shaped edge 67 of the rib 66 and into frictional engagement with the crotch of the V-shaped groove 36 in the rib 35. Thus, the spring 70 serves to hold the storage and transfer trays 10 and 50 in mated relation until forcefully separated by a user.

Assuming that slides in the compartments 27 of the storage tray 10 have been transferred into the compartments 68 of the transfer tray 50, as indicated by the position of the slides S' in FIGS. 3, 4, 5 and 7, the slides are now in position for transfer into the compartments of the projection tray 45. This fact may be visually verified by a user by observing that the corners, indicated at 75 in FIGS. 3 and 5, of the slides S' are all visible and extend into an annular recess 76 (FIG. 3) defined by a removed portion of the base 52 and side wall 53 of the tray. Alternately, the material of the base 52 and side wall 53 of the transfer tray 50 could be transparent so that a user could observe the positions of the slides in the transfer tray directly through the base and side wall.

The slide projection tray 45, in the present instance, is a type manufactured by Eastman Kodak Company for use with slide projectors, also manufactured by this company and marketed under the trademark Carousel. The projection tray 45 thus includes inner and outer cylindrical walls or shells 82 and 83, respectively, and an annular plate-like disk 84, which closes one end of the space between the inner and outer walls 82 and 83. The disk 84 provides a bottom support for the slides. The end of the projection tray 45 opposite the bottom wall 84 is open for the insertion of slides.

A plurality of partitions 86 (in the present instance, eighty-one) extend radially between the walls 82 and 83 and define eighty compartments therebetween. A few of the compartments of the projection tray 45 are indicated at 87 in FIG. 7. As shown in FIG. 5, the partitions 86 are generally U-shaped, each having a radially inner portion 92 secured to the wall 82, an outer portion 93 secured to the wall 83, and a connecting portion 94. The free edges of the connecting portions 94 at the open side of the tray have notches or cutouts 95 to facilitate manual grasping of slides in the compartments 87.

A plurality of indexing pins 96 extend axially from a rim 97, which projects generally radially outwardly from the bottom wall 84. The pins 96 are adapted to be moved by a slide tray drive mechanism on the slide projector, which rotates the tray 45 in increments. In addition, the projector and slide projection tray 45 have a slide transfer mechanism (not shown) for transferring slides, one-by-one, from the slide projection tray 45 to the slide projector and back. Such mechanism forms no part of the present invention. Additional details of the construction of the slide projection tray 45 are described in the U.S. Robinson Pat. No. 3,276,156.

Indicia (not shown) in the form of numbers "0" to "80" are provided on the rim 97 of the tray 45. The eighty functional slide compartments of the tray 45 are respectively identified by the numerals "1" through "80". The "0" compartment remains empty at all times to enable the above-mentioned slide transferring mechanism to function. Bridging material (not shown) spans a portion of the "0" compartment to render it non-functional and an axially outwardly extending protuberance 98 (FIGS. 5 and 9) is provided on the bridging material. The protuberance 98, while serving a different function on the tray 45, is utilized to advantage in the present invention in that it serves to index the compartments 68 of the slide transfer tray 50 with the compartments 87 of the projection tray 45. This is accomplished by providing a complementally-shaped recess 99 (FIGS. 4, 5 and 9) in the radially inner end of the rib 66 of the transfer tray 50 for receiving the protuberance 98. An upraised pin 101 is also provided on the upper surface of the rib 66, adjacent the side wall 53, for extension into the "0" compartment of the projection tray 45.

To further assure accurate alignment of the compartments 68 in the transfer tray 50 with the compartments 87 in the projection tray 45, the aforementioned aligning and indexing means includes an outwardly offset, circumferential flange or skirt 102 (FIGS. 3 and 5) on the bottom of the outer cylindrical wall 53 of the tray 50. As best seen in FIGS. 5 and 9, the skirt 102 is offset and dimensioned to encircle and receive in close-fitting telescopic relation the edge of the outer cylindrical wall 83 of the projection tray 45 so that the open sides of the two trays are juxtaposed to permit alignment of their respective slide compartments. While being shown as a continuous circumferential flange 102, a similar result could be obtained by using a plurality of circumferentially spaced tabs or fingers.

To further facilitate alignment and indexing of the compartments 87 in the projection tray 45 with the compartments 68 in the transfer tray 50, an indicator or pointer 103 (FIGS. 4 and 8) may be provided in the skirt 102 of the transfer tray 50 and a reference mark, such as a pressure sensitive sticker 104, may be applied to the outer surface of the side wall 83 so as to lie immediately above the pointer 103 and in radial alignment with the "0" compartment of the projection tray 45. The pointer 103 may be defined by adjacent recesses or scallops 106 in the edge of the skirt 102.

The method of using the slide storage tray 10 of the present invention will now be described. For this purpose, it will be assumed that the projectionist has selected a slide storage tray 10 having slides stored therein for projection and has also erected a transfer tray 50 and an empty projection tray 45. The method of transferring the slides from their compact stored positions in the storage tray 10 to the compartments in the projection tray 45 is as follows:

If the dust cover 40 is still engaged with the storage tray 10, it is removed by lifting the same upwardly. The storage tray 10, with the slides therein, is held in axially spaced concentric relation with the transfer tray 50 and then rotated relative thereto, if necessary, in order to bring the groove 36 in the rib 35 into alignment with the end 67 of the "0" rib 66 of the transfer tray 50. The trays 10 and 50 are then moved into engaged relation until the base 11 of the stoage tray 50 is resting on the shoulder 57 provided by the offset portion 54 of the annular, base 52 of the transfer tray 50. As the storage and transfer trays 10 and 50 are shifted into nested relation, as shown in FIG. 3, the loop 73 (FIG. 6) of the spring 60 frictionally engages the crotch of the groove 36 in the rib 35 and holds the storage and transfer trays in nested relation.

After the storage and transfer trays are fully engaged, the slides in the compartments 27 of the storage tray 10 are shifted radially outwardly into the radially aligned compartments 68 in the transfer tray 50. While such shifting is easily and conveniently done manually, some type of pushing mechanism could be employed to effect radially outward movement of the slides into the compartments 68 of the transfer tray 50.

After all of the slides are positioned in their transfer positions in the compartments 68 of the transfer tray 50, as shown in FIGS. 3 and 5 and evidenced by the presence of the corners 75 of the slides in the annular recess 76, the empty projection tray 45 is inverted and moved into axial position over the mated storage and transfer trays. It is assumed that the storage and transfer trays are at this time resting on a level surface, such as a projection table. Prior to inverting the projection tray 45, the annular locking ring (not shown) utilized to retain slides in the compartments 87 of the projection tray 45 is removed if the ring happens to be engaged with the projection tray. The empty projection tray 45 is then rotated relative to the transfer tray 50 until the "0" compartment in the projection tray is aligned with the rib 66 of the transfer tray 50. Such alignment is facilitated by aligning the V-shaped pointer 103 (FIG. 8) in the skirt 102 of the transfer tray 50 with the pressure sensitive sticker 104, or other indicia, on the outer surface of the outer wall 83 of the projection tray.

The empty and aligned projection tray 45 is then moved axially downwardly toward the transfer tray 50 until the projection tray is fully mated with the transfer tray 50, as shown in FIG. 5. When so mated, the protuberance 98 on the projection tray 45 extends into the recess 99 in the rib 66 and the upstanding pin 101 on the rib 66 extends into the "0" compartment of the projection tray.

After the projection tray 45 is fully mated with the transfer tray 50, the upper ends of the slides in the compartments 68 of the transfer tray 50 will extend partially into the lower ends of the compartments 87 in the projection tray 45, as shown by the slide S' in FIG. 5. Thus, the possibility of slides in the compartments in the tray 50 getting into the wrong compartments in the tray 45, or shifting radially inwardly back into the compartments 68 in the storage tray 10, is eliminated.

Transfer of slides from the compartments 68 in the transfer tray 50 into the compartments 87 in the projection tray 45, as shown by the position of the slide S'' in FIG. 9, is effected by inverting the mated storage, transfer and projection trays. Actual transfer takes place by gravity but, to insure complete transfer, the trays may be shaken a few times. In this regard, the transfer tray 50 may be made of transparent material to permit the user to observe whether or not the slides have been properly transferred, as previously described. The mated storage and transfer trays can now be separated from the projection tray 45 and the latter engaged with the slide projector in the usual manner. This involves engaging the locking ring (not shown) with the projection tray 45 prior to beginning projection.

After the projection tray 45 has been loaded with slides, the now empty and still mated storage and transfer trays 10 and 50 may be set aside until projection has been completed. The slides in the projection tray 45 are then returned to their compartments in the storage tray 10 by a reversal of the aforementioned steps that are followed in order to effect transfer of the slides from the compartments in the storage tray 10 to the compartments in the transfer tray 50 and thence into the compartments in the projection tray 45. In other words, the locking ring which holds the slides in the projection tray 45 is initially removed, the mated storage and transfer trays 10 and 50 are inverted, aligned and indexed with the compartments in the projection tray 45, and then shifted into engagement with the projection tray 45, as shown in FIG. 9. Prior to engaging the mated storage and transfer trays, the "0" rib 66 is aligned with the "0" chamber in the projection tray 45 by aligning the pointer 103 with the circular mark 104, as previously described. Engagement of the mated storage and transfer trays 10 and 50 with the projection tray 45 may be effected while the projection tray 45 is mounted on the associated slide projector or after the projection tray 45 has been removed from the projector.

After the trays 10, 50 and 45 are engaged with each other, the assembly is inverted so that slides in the compartments 87 of the projection tray 45, as indicated by the position of the slide S" in FIG. 9, are transferred by gravity into the compartments 68 in the transfer tray 50. While the slides will normally completely transfer by gravity into the compartments of the transfer tray 50, as indicated by the position of the slide S' in FIG. 5, shaking of the assembled trays will normally assure complete transfer of all the slides. In this regard, it will be noted that the upper ends of the ribs 62 in the transfer tray 50 are chamferred as at 107 to minimize any possibility of slides "hanging up" on the upper ends of the ribs. The phantom line representations of the lower portion of the slide S" in FIG. 7 illustrates how the chamfers 107 on the upper ends of the ribs 62 will guide a descending slide into the compartments 68 in the transfer tray 50 even though the slide is not centered in its compartment 87 in the projection tray 45. The flared entrances 32 at the outer ends of the compartments 27 also eliminate any possibility of slides contacting and "hanging up" on the upper ends of the ribs 16, as will be apparent from FIG. 4.

After the slides are fully transferred into the compartments of the transfer tray 50, as evidenced by the corner 75 of the slides in the recess 76 (FIGS. 3 and 5), the projection tray 45 may be disengaged from the transfer tray 50. Thereafter, the slides are shifted radially inwardly into their compartments in the storage tray 10, as illustrated by the positions of the slides S in FIGS. 1 and 3. In this regard, the annular recess 76 in the transfer tray 50 permits a user to manually shift the slides a short distance radially inwardly into the compartments 27 of the storage tray 10. Thereafter, the user may use the tip of his finger to engage upper, radially outer corners of the slides, which are then accessible, to shift the slides fully into the compartments 27. The storage tray 10 may then be disengaged from the transfer tray 50 by axially separating the storage and transfer trays. Thereafter, the dust cover 40 may be engaged with the storage tray 10 to retain the slides in their compartments and to prevent lint, dust and the like from accumulating thereon.

From the foregoing description, it should now be apparent that significant economies and reduction of storage space will be realized through utilization of the miniature slide storage tray of the present invention with a minimal amount of effort on the part of the projectionist from the time a group of slides is selected for projection and returned to storage.

Although the invention has been herein described with reference to a specific structural embodiment, it should be understood that various modifications and equivalents may be resorted to without departing from the scope of the invention as defined in the appended claims.

I claim:

1. In combustion, a slide storage tray for storing a plurality of slides in a prearranged, closely compacted relation, and a slide transfer tray for receiving and holding said slides in prearranged positions so as to permit said slides to be transferred from said transfer tray into compartments in an associated slide projection tray, said storage tray comprising a plate-like base having partition means thereon defining a plurality of open-ended compartments for receiving and supporting a plurality of slides in segregated, annularly arranged, radially extending relation, said slide transfer tray comprising a plate-like base, a cooperating cylindrical wall and partition means defining a plurality of slide compartments with openings at one side for receiving slides transferred from the compartments of said slide storage tray, said slide transfer tray being movable into engaged relation with said slide storage tray, and alignment and indexing means carried by said slide transfer and storage trays and operable to maintain axial and radial alignment between respective compartments of said slide storage and transfer trays so that slides can be freely transferred between said compartments.

2. The combination of claim 1, in which the base of said storage tray is substantially circular, and the base of said transfer tray is substantially annular and adapted to surround and concentrically support said slide storage tray.

3. The combination of claim 2, in which at least a portion of the base of said transfer tray adjacent to the opening therein is offset so as to provide a ledge for receiving a portion of the periphery of said storage tray.

4. The combination of claim 3, in which the base of said storage tray is substantially coplanar with the base of said transfer tray when said storage tray is supported on the ledge of said transfer tray.

5. The combination of claim 2, in which said associated slide projection tray has cooperating radially inner and outer cylindrical walls and partition means therebetween defining a plurality of compartments for receiving and supporting a plurality of slides in segregated, annularly arranged, radially extending relation, and the cooperating wall of said slide transfer tray is of substantially the same diameter as that of the radially outer wall of said associated slide projection tray.

6. The combination of claim 5, in which the diameter of the base of said slide transfer tray is less than that of the cooperating cylindrical wall thereof, whereby an annular recess is defined in the periphery of said transfer tray through which a portion of the slides in said compartments project, said annular recess permitting a user to ascertain whether or not all of the slides in the compartments of said slide storage tray have been fully transferred into their respective compartments in said slide transfer tray, said recess also permitting a user to shift the slides radially inwardly a sufficient distance to expose the radially outer, upper corners thereof so that the slides can be fully shifted into the compartments of said storage tray.

7. The combination of claim 1, in which the partition means of said slide storage and transfer trays comprises a plurality of upstanding ribs on the bases of said storage and transfer trays, and said alignment and indexing means maintains the ribs on said storage tray in substantial radial alignment with the ribs on said transfer tray when said storage and transfer trays are in engaged, operative relation.

8. The combination of claim 7, in which the radial length of the ribs of said storage and transfer trays is less than the length or width of said slides, whereby a portion of the slides in the compartments of said storage tray extends into the compartments of said transfer tray and vice-versa when said trays are in engaged, operative relation.

9. The combination of claim 7, in which the width of the compartments in said slide transfer tray is greater than the width of the compartments in said slide storage tray, whereby slides in said storage tray compartments can be easily shifted into the compartments of said transfer tray with minimal contact with the walls of the compartments of said transfer tray.

10. The combination of claim 9, in which the radial center lines of the compartments in said slide transfer and storage trays are coincident.

11. The combination of claim 7, in which the radially outer ends of the compartments in said slide storage tray are flared, whereby slides are prevented from contacting the radially outer ends of the ribs of said transfer tray while being transferred from the compartments in the associated projection tray into the compartments of said transfer tray.

12. The combination of claim 7, in which the compartments of said slide projection tray are defined by a plurality of circumferentially spaced, radially extending ribs, the ribs of said transfer tray are adapted to be aligned with the ribs of said projection tray when said transfer and projection trays are in mated relation, and the width of the compartments in said transfer tray are adapted to be less than the width of compartments in said projection tray.

13. The combination of claim 12, in which the ribs of said transfer tray are adapted to be greater than the width of the ribs of said projection tray, and the upper ends of the ribs of said transfer tray are chamferred to prevent slides transferring from the compartments of said projection tray into the compartments of said transfer tray from contacting or coming to rest on the edges of the ribs of said transfer tray.

14. The combination of claim 7, in which said alignment and indexing means comprises interfitting means on the adjacent ends of at least one rib on each of said storage and transfer trays, said interfitting means preventing relative rotation between said storage and transfer trays when said storage and transfer trays are in engaged, operative relation.

15. The combination of claim 14, in which said interfitting means comprises a recess in the end of said one rib on one of said storage and transfer trays and a projection on the end of said one rib on the other of storage and transfer trays and adapted to closely fit said recess.

16. The combination of claims 14 or 15, in which said alignment and indexing means includes at least one elongated rib on one of said storage and transfer trays, the end of said elongated rib being engageable with the end of a radially aligned rib on the other of said storage and transfer trays, the engaged ends of said ribs coacting with said interfitting means to prevent relative rotation and shifting of said storage and transfer trays.

17. The combination of claim 16, in which said alignment and indexing means includes a pair of elongated, circumferentially spaced ribs on one of said storage and transfer trays, the ends of said elongated ribs being engageable with the ends of a pair of radially aligned ribs on the other of said storage and transfer trays.

18. A method of transferring a plurality of compactly grouped slides from a plurality of annularly arranged compartments in a slide storage tray to a plurality of annularly arranged, radially aligned compartments in a slide transfer tray of larger diameter than said storage tray and then into a plurality of axially aligned, annularly arranged, circumscribing compartments in an associated slide projection tray of substantially the same diameter as said slide transfer for projection in a slide projector, said method comprising the steps of engaging the transfer tray with the storage tray so that the compartments in the transfer tray are radially aligned with the compartments in the storage tray, effecting radial movement of slides out of the compartments of the storage tray into the compartments of the transfer tray, inverting the associated projection tray, engaging the inverted projection tray with the transfer tray so that the compartments in the projection tray are axially aligned with the compartments in the transfer tray, and inverting the engaged storage, transfer and projection trays to effect transfer of slides in the compartments of the transfer tray into the compartments of the projection tray.

19. A method of transferring slides from radially extending, annularly arranged compartments in an annular slide projection tray adapted for use with an associated slide projector into radially extending, annularly arranged compartments in an annular slide storage tray of substantially smaller size than the projection tray so that the slides are grouped in a compact manner and occupy a substantially smaller amount of space than is required to store the slides in the projection tray, said method comprising the steps of engaging an annular transfer tray having a plurality of radially extending, annularly arranged compartments and a diameter substantially the same as that of said projection tray with said storage tray, inverting the mated transfer and storage trays, engaging the inverted trays with the associated projection tray, inverting the mated projection, transfer and storage trays so that slides in the compartments of the projection tray are transferred by gravity into the compartments of the transfer tray, disengaging the projection tray from the mated transfer and storage trays, effecting movement of slides in the compartments of the transfer tray into the compartments of the storage tray, and disengaging the transfer tray from the storage tray for reuse with another storage tray and the same or another projection tray.

* * * * *